UNITED STATES PATENT OFFICE.

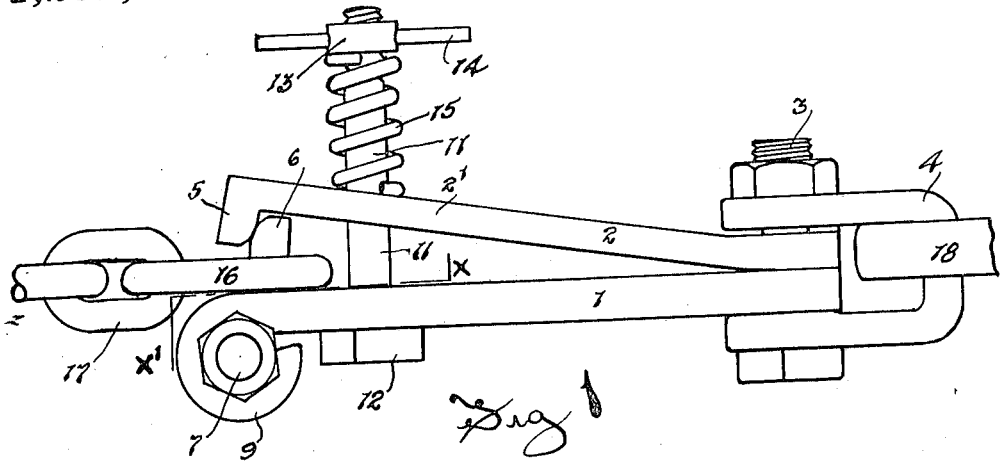
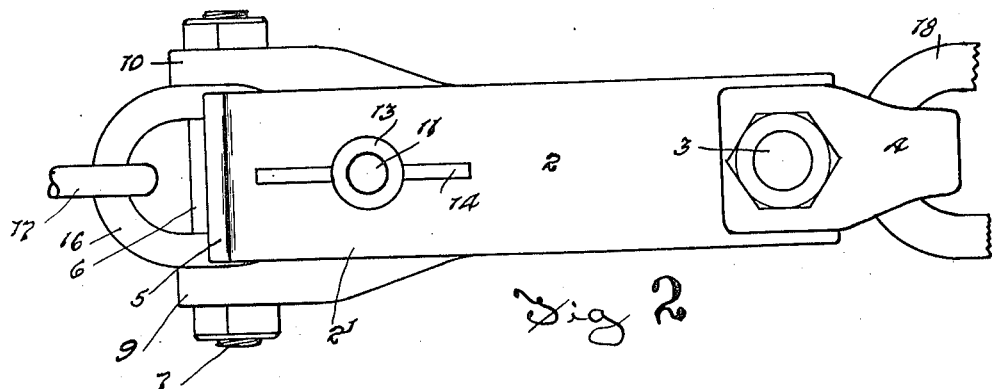
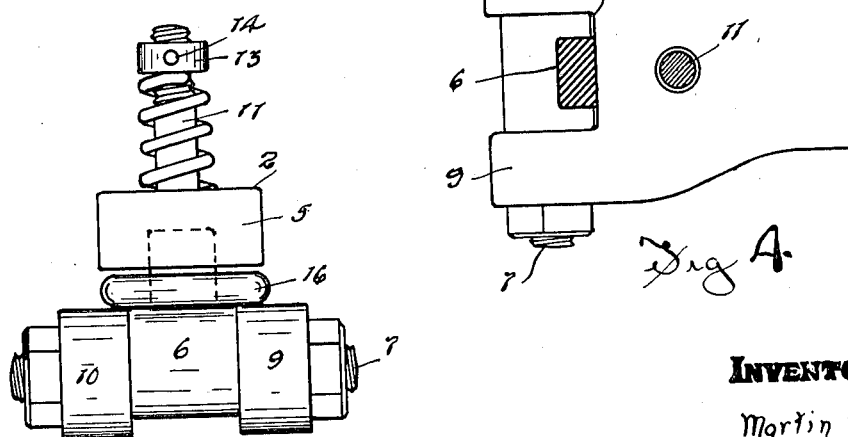

MARTIN PARKER, OF TYNDALL, MANITOBA, CANADA, ASSIGNOR OF ONE-HALF TO LEE HAMILTON WOLVIN, OF WINNIPEG, MANITOBA, CANADA.

SAFETY-HITCH.

1,292,032.  Specification of Letters Patent.  Patented Jan. 21, 1919.

Application filed May 15, 1918. Serial No. 234,735.

*To all whom it may concern:*

Be it known that I, MARTIN PARKER, of the village of Tyndall, in the Province of Manitoba, Canada, have invented certain new and useful Improvements in Safety-Hitches, of which the following is the specification.

The invention relates to improvements in safety hitches particularly as utilized in agricultural work and the principal object of the invention is to provide a safety hitch which will release to free the load upon the load becoming excessive, thereby preventing the breaking of the hitch.

A further object of the invention is to construct the hitch in a simple, durable and efficient manner, so that it can be manufactured at a comparatively small cost and so that it can be readily rehitched as occasion may demand.

A further object of the invention is to construct a hitch which can be adjusted to release the load at a predetermined time.

With the above objects in view the invention consists essentially in a pair of draft bars connected together at one end and fitted with a clevis or other such hitching connection and with one of the bars provided at its free end with a catch, a pivoted dog carried by the free end of the other of the bars and normally engaging the catch, adjustable means for resiliently holding the bars together and a hitching ring normally receiving the dog, the parts being arranged and constructed as hereinafter more particularly described and later pointed out in the appended claims, reference being had to the accompanying drawing in which:—

Figure 1 represents a side view of the hitch.

Fig. 2 represents a plan view thereof.

Fig. 3 represents a front end view.

Fig. 4 represents a horizontal sectional view through the hitch, the section being taken in the plane denoted by the line X—X' Fig. 1 and looking downwardly.

In the drawing like characters of reference indicate corresponding parts in the several figures.

I wish here to explain that under present conditions considerable damage is done and time lost through hitches being broken in instances where a machine such as a traction engine is pulling an agricultural implement such as a gang of plows, the reason being that no provision is made in the hitch between say the tractor and the plow which will release upon the load becoming excessive.

My invention relates to a simple device which can be inserted in the hitch and can be adjusted to accommodate the normal load but which will release to free the load upon an excessive strain being brought on the hitch such as occurs where the plows strike a big stone or a root.

Referring now to the drawing; 1 and 2 represent a pair of draft bars connected together at the one end by a bolt 3, the bolt carrying a clevis 4 for hitching purposes.

The bar 1 is a flat one while the bar 2 is bent upwardly so that the body portion 2' thereof inclines slightly.

The free extremity of the top bar is formed into a downturned catch 5 which is designed under working conditions to engage with the upper end of a dog 6 pivotally mounted on a cross bolt 7 carried by the free end of the bar 1. Here it will be observed that the middle part of the end of the bar which carries the bolt is cut away as indicated at 8 to receive the dog and that the side extensions 9 and 10 of the bar are bent into eyes to receive and hold the bolt.

The engaging faces of the catch and the dog are slightly rounded as best shown in Fig. 1 so that when the dog is pulled backwardly or to the left it will force the bar 2 up until the dog is free to release from the catch. The free ends of the two bars are adjustably held together by the parts now disclosed.

11 represents an adjusting bolt passed through suitable holes provided in the bars and having the lower end terminating in an enlarged head 12 and the upper end screw threaded and receiving an adjusting nut 13 fitted with suitable extensions 14 to allow of the easy adjustment of the nut.

Between the nut and the top side of the bar 2 and on the bolt I locate a spiral compression spring 15. 16 represents a hitching ring normally receiving the dog and entered between the rear ends of the bars. When this device is to be used it is inserted in the hitch such as between a traction engine and a gang of plows in any suitable manner such as by connecting the plows by means of a chain 17 to the ring 16 and the draft beam of the engine to the clevis 4 by means of a further clevis 18.

I have not considered it necessary to show the device as in actual use but have explained its use as associated with a tractor and gang of plows in order that it may be better understood and in this connection it is to be understood that while a particular application of the hitch has been described, I do not wish to be limited in any way to the particular use of it as it could be used in any place where a release hitch is of advantage.

In actual practice after the safety hitch has been inserted between the tractor and the load, such as the plow, the nut 13 is tightened down to compress the spring and this adjustment is made as experience teaches in direct proportion to the load to be pulled, the final adjustment being such that under normal working conditions the dog will not release from the catch and upon the load becoming abnormal the dog will force the catch up against the pressure of the spring until it frees from the catch and swings rearwardly and releases the ring 16.

Obviously immediately an abnormal condition arises the strain becomes excessive and the hitch acts to release the ring.

It will be readily apparent that if one has this device installed and finds that the hitch is releasing too often, all that it is necessary to do is to give the nut 13 a turn or so until the proper adjustment is effected.

What I claim as my invention is:—

1. The combination with a pair of members yieldingly held together, of a hitching connection inserted between free ends of the members and means normally restraining the hitching connection against withdrawal from between the members but designed to release the hitching connection in the spreading apart of the members.

2. A safety hitch comprising a hitching member, a pair of yieldably connected members adapted to receive between their free ends and hold the hitching member under normal conditions of load and to release and free the hitching member upon the load becoming excessive.

3. A safety hitch comprising a pair of draft bars connected together at one end and having their other ends spread apart, a hitching member normally received between the free ends of the bars, means yieldingly pressing the free ends of the bars toward each other and means located at the ends of the bars designed to hold the hitching connection between the bars under normal load and to spread the bars apart and release the hitching connection upon the load becoming excessive.

4. A safety hitch comprising a pair of bars connected together at one end, a dog pivotally secured to the free end of one of the bars and normally engaging the other of the bars, a hitching connection passing between the bars and engaging the dog and means for effecting the inward pressure of the bars to hold the hitch closed.

5. A safety hitch comprising a pair of bars connected together at one end, a dog pivotally secured to the free end of one of the bars, a catch located at the free end of the other of the bars and engageable with the dog, a hitching connection inserted between the bars and engageable with the dog and yielding means pressing the free ends of the bars together.

6. A safety hitch comprising a pair of bars connected together at one end, a dog pivotally secured to the free end of one of the bars, a catch located at the free end of the other of the bars and engageable with the dog, a hitching connection inserted between the bars and engageable with the dog and adjustable pressure means holding the ends of the bars yieldably together.

7. A safety hitch comprising a pair of bars connected together at one end, a dog pivotally secured to the free end of one of the bars, a catch located at the free end of the other of the bars and engageable with the dog, a hitching connection inserted between the bars and engageable with the dog, a bolt passing through the free ends of the bars and provided at one end with an enlarged head and at the other end with an adjusting nut and a spring inserted on the bolt between the adjusting nut and the adjacent bar.

Signed at Winnipeg, this 15th day of April, 1918.

MARTIN PARKER.

In the presence of—
G. L. ZOXBURGH,
K. B. WAKEFIELD.